June 13, 1961  B. VER NOOY  2,988,111
FLUID TIGHT CLOSURE
Filed Oct. 6, 1958  3 Sheets-Sheet 1
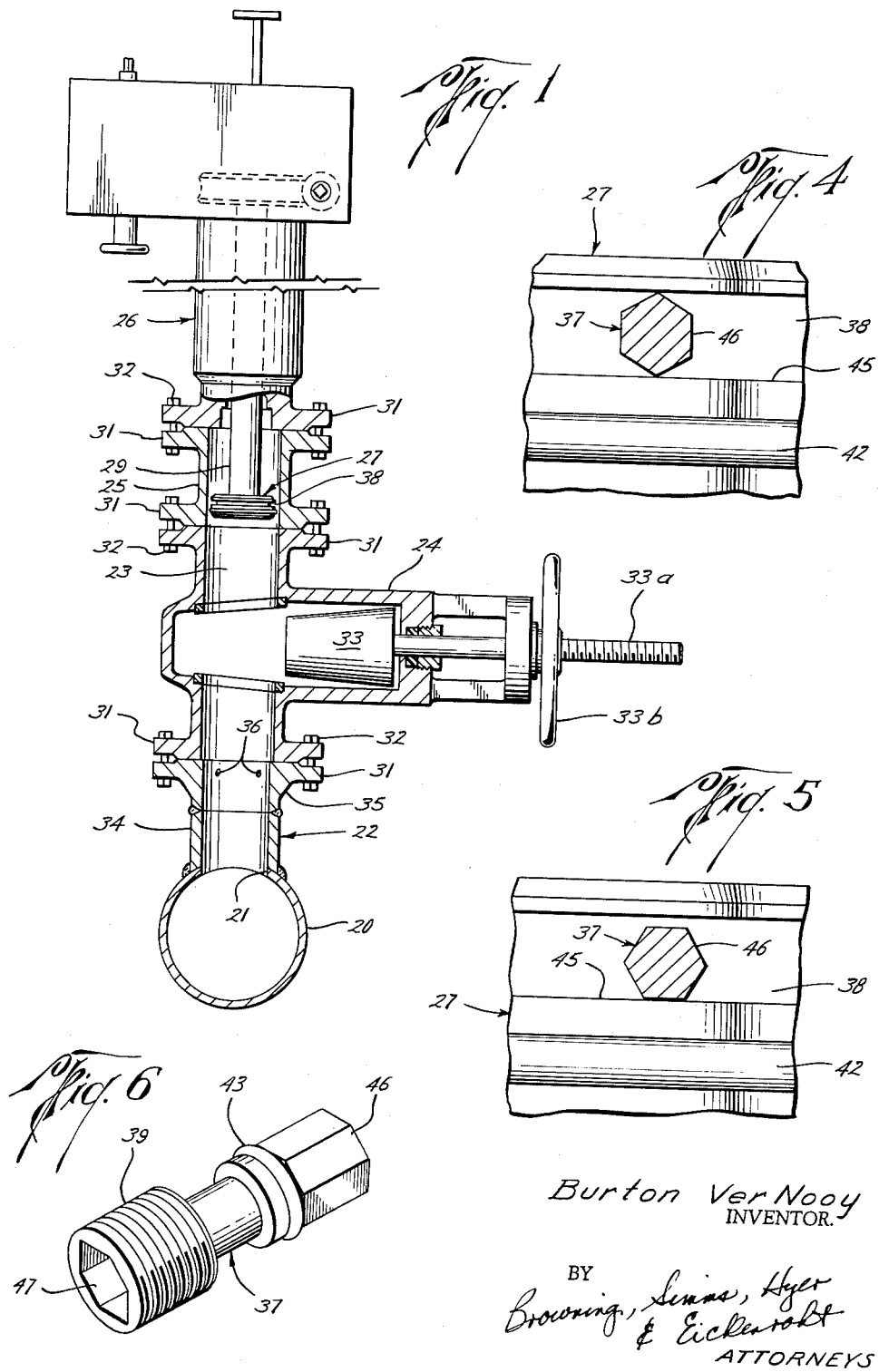
Burton Ver Nooy
INVENTOR.
BY Browning, Simms, Hyer
& Eickenroht
ATTORNEYS

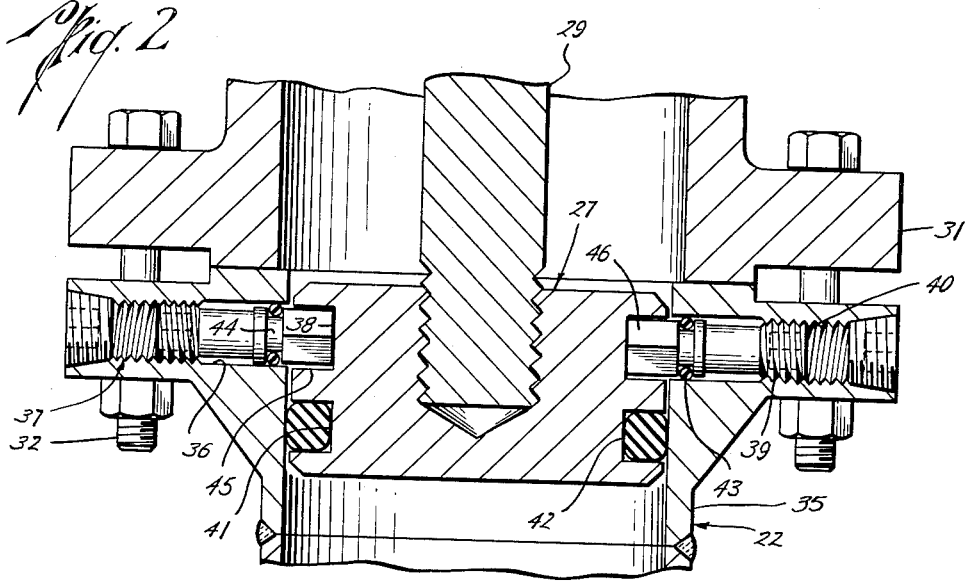

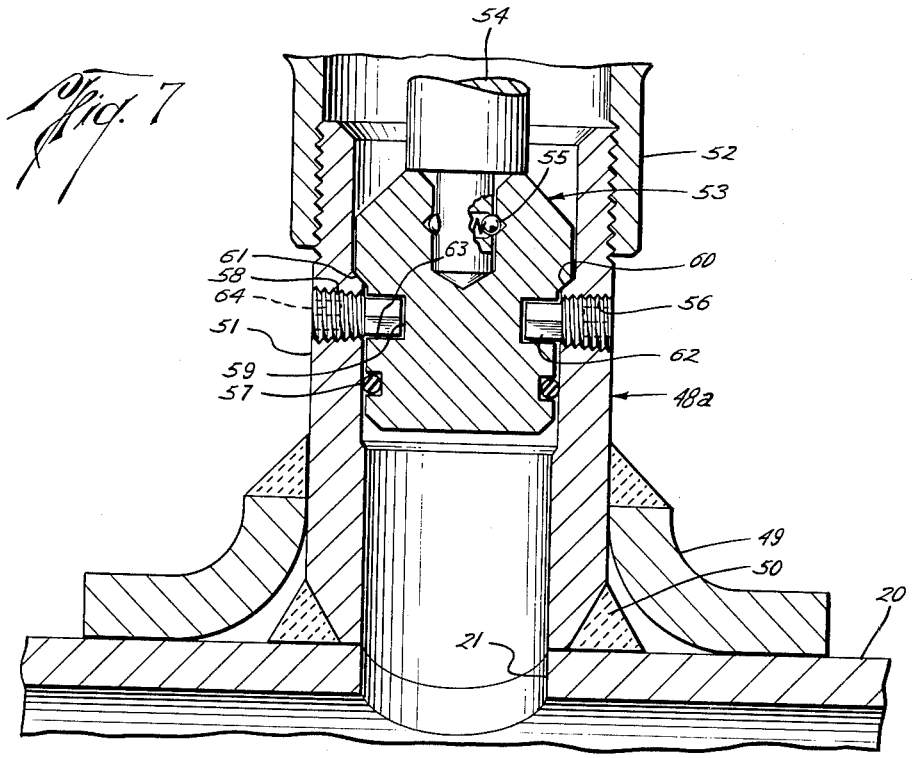
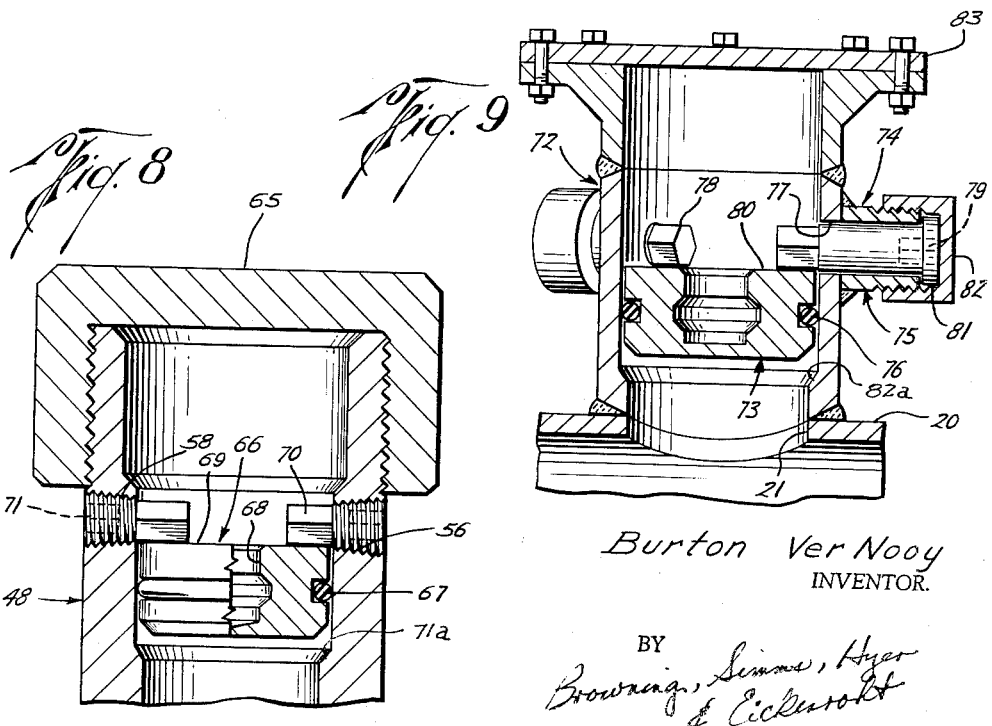

United States Patent Office 2,988,111
Patented June 13, 1961

2,988,111
FLUID TIGHT CLOSURE
Burton Ver Nooy, Tulsa, Okla., assignor to
T. D. Williamson, Inc., Tulsa, Okla.
Filed Oct. 6, 1958, Ser. No. 765,564
9 Claims. (Cl. 138—89)

This invention relates generally to apparatus for forming a fluid tight closure; and, more particularly, to improvements in that type of apparatus shown in Patent No. 2,771,096.

As stated in my earlier patent, it may be desired to provide access to the interior of the line for the purpose of inserting or removing a tool, and then seal the same closed, without a substantial loss of pressure from the line. One method of performing this operation involves mounting upon the line, in the order named and in superimposed relation, a pipe nipple or stud, a block valve, and a boring machine. When properly assembled, the machine and valve permit a bit to be run on the boring bar of the machine through the valve and nipple to drill a hole in the portion of the line surrounded by the nipple, such that the latter becomes a connecting conduit between the fluid tight chambers or vessels provided by the pipeline and the boring apparatus.

Upon retraction of the boring bar and closing of the intermediate block valve, the bit may be replaced by a suitable device for running the tool into the line through the just drilled hole. When the tool has been inserted, the boring bar may again be retracted for inserting a body or plug into the conduit for fluid tight sealing and locking therein. At this time, the valve and boring machine may be removed from the line and replaced by a blind flange. Obviously, the tool may be removed from the line by a reversal of this procedure.

An object of this invention is to provide apparatus of this type which is of greatly simplified construction.

Another object of this invention is to provide such apparatus which may be installed in the field without a specially prefabricated conduit.

These and other objects are accomplished, in accordance with the present invention, by apparatus which includes a conduit for connecting pressure vessels, such as a pipe line and an enclosed chamber provided by the aforementioned valve and boring machine, and a plug insertable from the chamber through one end of the conduit. The plug has an annular surface which faces said chamber, which surface may be formed by a groove about the plug, as in the case of my earlier invention.

A plurality of pins are mounted on the conduit for reciprocation between positions in which their inner ends are retracted to permit insertion and removal of the plug and extended into locking position over the annular surface on the plug. Each pin is provided with means including an indexing part observable from the exterior of the conduit for orienting a surface on the inner end thereof into face-to-face engagement with the annular plug surface. In this way, the force of the pipeline fluid may be distributed over a large area of the pins so as to avoid deforming either or both the plug and pin. The escape of fluid from the pipeline is prevented by sealing means between the conduit and plug.

In those cases in which the conduit is prefabricated, the pins are threadedly connected to holes therein for rotation and reciprocation between the described positions. When, however, the conduit has not been specially formed, such holes are drilled in the field and tubular parts are welded to the conduit exterior to provide a continuation of the holes and slidably receive the pins over a large bearing area. In either case, however, the inner end of each pin has a surface coplanar to the annular plug surface which may be oriented into face-to-face engagement therewith. For this purpose, the aforementioned indexing part comprises a surface on the outer end of each pin parallel to the one on the inner end thereof. Preferably, there are a plurality of such surfaces on the inner and outer ends of the pins so as to facilitate orientation and provide a connection for conventional wrenches and the like for rotating the pins.

In the drawings, wherein like reference characters are used throughout to designate like parts:

FIG. 1 is an elevational view, partly in section, of a pipeline having a boring machine mounted over a hole therein, and showing the plug of one form of the apparatus of the present invention connected to the boring bar of the machine for insertion into the conduit connecting the pipeline and machine;

FIG. 2 is an enlarged sectional view of this form of the apparatus, with the plug inserted into the conduit thereof and locked in place by the pins on the conduit;

FIG. 3 is a view similar to FIG. 2, but in which the boring machine and the block valve have been removed and replaced by a blind flange;

FIGS. 4 and 5 are detailed views showing the position of the inner end of each pin of the apparatus of FIGS. 1 to 3 prior and subsequent to orientation thereof;

FIG. 6 is a perspective view of one of the pins removed from the conduit;

FIG. 7 is a view similar to FIG. 2 of another form of the apparatus of the present invention;

FIG. 8 is a view similar to FIG. 3 of still another form of the invention; and

FIG. 9 is a view similar to FIGS. 3 and 8 of a still further embodiment thereof.

Referring now particularly to the above-described drawings, there is shown in FIG. 1 a pipeline 20 adapted to transport fluid under pressure and having a hole 21 through a wall thereof. A pipe stub or nipple 22 is welded to the pipeline in surrounding relation to the hole 21 so as to form a conduit connecting the interior of the line and a chamber or vessel 23 defined by the sealed passages through a block valve 24 mounted above the stub, and a reducing nipple 25 connected above the valve and the lower sealed end of a boring machine 26 mounted on the reducing nipple. As can be seen from FIG. 1, the vessel 23 is elongate and cylindrical to permit movement of a plug 27 longitudinally therethrough into locking position within the conduit 22, as shown in FIG. 2.

This plug 27 is removably attached, as by the threads 28 (see FIGS. 2 and 3) to the lower threaded end of a boring bar 29 which is sealably slidable within the upper end of the boring machine 26 in a manner well known in the art. As shown in FIG. 3, when the boring bar 29 is disconnected from the plug and the boring machine, reducing nipple and block valve forming the vessel 23 removed therefrom, the upper end of the conduit 22 may be closed by a blind flange 30.

The conduit, valve, reducing nipple and boring flange are each provided with flanged ends 31 for connection together in the manner shown, as by bolts 32. As shown in FIG. 3, these bolts and bolt holes in the conduit 22 for receiving them also permit the blind flange 30 to be connected over the upper end of the conduit. Thus, these connections form substantially fluid tight closures such that, with the block valve 24 opened, as shown in FIG. 1, the pressures in the pipeline and the vessel 23 will equalize.

As previously mentioned, suitable apparatus such as the boring machine 26, may be used to drill the hole 21 in the pipeline, insert a tool or the like through the opening and into the line, and then move the plug 27 into locking position within the conduit 22 for sealably closing same, all of such operations being performable without a substantial loss of pressure from the line. Reference is had to the apparatus described in my earlier patent for a more complete description of such a machine. In any case, however, suitable mechanism is provided in the machine for reciprocating the boring bar 29 longitudinally of the vessel 23, and also rotating the bar in opposite directions so as to permit its connection to and disconnection from the plug 27.

The block valve 24 includes a gate 33 on a stem 33a for reciprocation by means of a hand wheel 33b between the open position of FIG. 1 and a closed position (not shown). In the operation previously described, it is the ordinary practice to attach a bit to the lower end of the boring bar 29, open the valve 24 by retracting the gate 33, and then extend the bar down through the valve and the conduit 22 for drilling the hole 21 by means of the bit. After the hole has been drilled, the bar may be raised to a position above the valve, the valve closed and the bit replaced on the end of the bar 29 with the particular tool to be inserted within the line. Then, upon reassembly of the boring machine with the valve, the valve may again be opened, the tool run through the valve and conduit into the pipeline, detached from the bar, and the bar then raised above the valve. As described in my earlier patent, a similar procedure is followed in attaching the plug 27 to the bar, then reopening the valve 24, so that the plug is ready for insertion into locked position with the conduit 22.

The conduit 22 comprises a lower nipple portion 34 which is welded to the pipeline 20 and an upper flanged section 35 welded to the nipple. As will be apparent from the description to follow, however, the conduit need not be formed of two sections, but may comprise a single section. In any case, the conduit is connected at its opposite ends to the pressure vessels.

The plug 27 is substantially cylindrical in shape for movement concentrically within the vessel 23 and is provided with a groove 38 about its periphery which is adapted to be positioned opposite holes 36 extending radially through the flanged portion 35 of the conduit. These holes receive pins 37 each of which has a portion threaded at 39 for connection with an intermediate threaded portion 40 of the holes 36. Thus, each of the pins may be rotated for reciprocation between a position in which its inner end is substantially removed from the bore through the conduit 22 and another position in which it will extend into the bore for reception in the groove 38 of the plug.

The plug 27 is also provided with another groove 41 which receives an O-ring 42 for sealing between the plug and conduit beneath the openings 36 so as to prevent the leakage of fluid out of the pipeline when the plug is in locked position. Smaller O-rings 43 received within grooves 44 on intermediate portions of the pins 37 sealingly engage with a smooth walled inner portion of the holes 36 to prevent leakage from the conduit prior to movement of the plug into sealing engagement therewith.

It will be understood that when the plug 27 is in the locked position of FIGS. 2 and 3, fluid pressure within the pipeline will act across the cross-sectional area thereof to force the plug upwardly. Thus, upon removal of the boring bar 29, the lower annular surface 45 of the groove 38 is forced upwardly into tight engagement with the inner end of each of the pins.

In order to distribute this force over as large an area as possible, and thereby prevent distortion of either the plug or the pins, each of the pins is provided with at least one flat surface 46 coplanar to the annular surface 45 on the groove which may be oriented into face-to-face engagement therewith by means of a parallel surface 47 on the outer end thereof. That is, as will be apparent from FIGS. 2 and 3, an operator may determine the relationship of the flat surface 46 on the inner end of the pin to the surface 45 of the plug by the position of the surface 47 on the outer end thereof. Preferably, this orientation would be made prior to removal of the boring bar 29 such that there would be little or no resistance to turning of the pins due to the force of the plug bearing against them.

In the preferred form of the present invention, several of such surfaces 46 and 47 are provided about the inner and outer ends of the pins, each such surface having a corresponding parallel surface on the opposite end thereof. In this manner, only a small amount of rotation is required in order to bring the inner surface into face-to-face engagement with the annular surface on the groove. As will be apparent from FIG. 6, as well as FIGS. 4 and 5, the outer surfaces 47 also form a part for connection with a suitable wrench or other means for rotating the pins.

When the pins have been moved into locking position, and the boring machine, reducing nipple and block valve have been removed from the upper conduit 22, the blind flange 30 may be connected thereto, as shown in FIG. 3, and suitable plugs 48 threaded into place within the outer tapered threaded portion of the holes 36.

As distinguished from the plug of the apparatus of my earlier patent, the present plug is particularly well adapted for use in installations where either or both of the pipeline pressure or the pipeline diameter is small. In such a case, there would be a correspondingly smaller force for the boring machine to overcome as the seal ring 42 engages and seals with such conduit during movement of the plug into the bore of the conduit 22. As a result, it is contemplated that the plug would not require a bypass valve therethrough, thereby further simplifying the construction of the apparatus. The simplified construction of the conduit, and particularly the flanged portion 31 thereof, will be obvious from the drawings. On the other hand, the present invention is advantageous in that it enables the use of both a plug and a conduit of at least approximately the same shape as were used in my earlier invention.

In the form of the invention shown in FIG. 7, a conduit 48a is connected to the pipeline 20 in surrounding relation to the hole 21 therein by means of a saddle 49 in addition to a weld 50. This conduit includes a nipple portion 51 having an upper threaded end for connection with a flanged portion 52 to which a block valve may be bolted, as shown in FIG. 1.

As also shown in FIG. 7, a plug 53 is releasably attached to the lower end of boring bar 54 by means of spring-pressed detents 55 or the like, so that the plug may be lowered on the lower end of the bar into the position shown for locking within the conduit 48a. Prior to disposal of the plug in locking position, threaded openings 56 in the conduit may be closed by means of suitable plugs (not shown). However, when the plug has been lowered into locking position, and the O-ring 57 thereabout has established a seal with respect to the conduit beneath the openings 56, the plugs may be removed and replaced with pins 58 threaded into locking position with respect to the peripheral groove 59 about the plug above the seal ring 57. An internal shoulder 60 on the bore of the conduit is adapted to engage with an external shoulder 61 on the plug to locate it in the locked position.

When the pins 58 have been moved into locking position within the grooves 59, and while the plug is still connected to the lower end of the boring bar, the pins 58 may be oriented into a position in which one of the flat surfaces 62 on the inner end thereof is in face-to-face engagement with the coplanar annular surface 63 formed by the groove. That is, the outer ends of the pins 58 are provided with surfaces 64 parallel to the surfaces 62 on the inner ends thereof so as to enable such orientation and also provide a connection for a suitable rotating tool. As in the case of the previously described form of the invention, when the boring bar is removed and the plug forced upwardly, the force of the pressure fluid within the pipeline will be distributed over a relatively large area of the pins.

It will be appreciated that the conduit of this last described form of the invention is of considerably simpler construction than that of the previously described form. It will also be understood that the thickness of the nipple portion 51 of the conduit provides a large bearing area for the portion of the pins 58 connected to the openings 56.

When the plug 53 has been locked in position, the flanged portion 52 of the conduit, as well as the block valve, reducing nipple and boring machine shown in FIG. 1, may be removed therefrom and replaced with a cap 65, as shown in FIG. 8, for closing the conduit above the plug.

Inasmuch as the conduit, the locking pins and the holes in the conduit for receiving the pins are the same in the form of the invention shown in FIG. 8 as they are in the form above-described, similar reference characters are used throughout. However, the plug 66 of the FIG. 8 embodiment is of still simpler construction in that it eliminates the upper portion and the groove of the plug 53 of the form shown in FIG. 7. Thus, the plug 66 is provided merely with a seal ring 67 thereabout for sealing engagement with the conduit beneath the holes 56 and a socket 68 in the upper end thereof for connection with a boring bar during insertion into the locked position shown. In the absence of a groove about its periphery, the upper annular surface 69 of the plug is adapted to be engaged by the extended inner ends of the pins 58 for holding the plug in locked position. As in the case of the previously described form, the inner and outer ends of the pins 58 are provided with flat surfaces 70 and 71, respectively, which are coplanar with the annular surface 69 about the plug so that the surfaces 70 may be oriented into face-to-face engagement therewith in the manner previously described. A shoulder on the lower end of the plug is engageable with a shoulder 71a in the conduit to prevent its being lowered more than necessary beyond a position for locking by the pins 58 and also to keep it from falling into the pipeline should the line pressure fall below that necessary to support it.

As previously mentioned, the form of the invention shown in FIG. 9 is particularly well adapted for field installation wherein the conduit 72 connected to the pipeline 20 in surrounding relation to the hole 21 therethrough has not been prefabricated for the purpose of locking the plug 73 in a position to seal same.

Since the nipple 72 would ordinarily not be thick enough to provide sufficient bearing area for the pins 74, tubular parts 75 are first welded to the exterior of the conduit at three equally spaced apart locations on a common radial plane. The plug 73 is then lowered in the manner previously described into a position in which the seal ring 76 thereabout seals with the conduit beneath the tubular parts 75. While the plug 73 is held in this position, suitable drilling apparatus may be attached to the tubular parts 75 for drilling the holes 77 through the conduit 72 in alignment with the bore through the tubular parts 75. At this time, the pins 74 are slidably received through the tubular parts and openings 75 so that their inner ends extend into locking position above the plug 73. As in the case of the forms of the invention previously described, the inner and outer ends 78 and 79 of the pins are provided with flat parallel surfaces coplanar to the annular surface 80 on the top of the plug 73 so that the surface 78 may be oriented into face-to-face engagement with the surface 80.

The outer ends of the pins 74 are also provided with enlarged heads 81 abuttable with the outer ends of the tubular parts 75 when in extended position, and caps 82 are provided for threading over the outer ends of the tubular parts so as to hold the pins 74 in locking position, as shown in FIG. 9. The block valve, reducing nipple and boring machine may be removed from above the conduit 72 and replaced by a suitable blind flange 83, as shown in FIG. 9. On the other hand, the boring machine may be used to remove the plug 73 and, for this latter purpose, the plug 73 may be held down in the position to seal beneath the holes 77 by means of the boring bar of the boring machine while the pins 74 are retracted. Then, with the plug 73 still held down in sealing position, the tubular parts 75 may be sealed closed, so that the plug 73 may be removed subsequently from the conduit with the boring bar.

Shoulder 82a is provided within the bore of the conduit 72 for the same purpose as shoulder 71a in the bore of conduit 48.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for forming a fluid tight closure between pressure vessels, comprising a conduit for connection to the vessels at its opposite ends, a plug insertable into the conduit through one end thereof and having a peripheral groove in the peripheral surface thereof, a plurality of pins mounted on the conduit for reciprocation between positions in which their inner ends are retracted to permit passage of said plug transversely of said pins and movement wherein said pins are extended into locking position in said groove, said pins having a substantially flat surface of substantial area on the annular surface at the inner ends thereof, means for providing said reciprocation including means indicating the orientation of said pins, the last-mentioned means being observable from the exterior of the conduit, said substantially flat surface being disposable for face-to-face engagement with one annular wall of said peripheral groove in the plug, and means for sealing between the plug and conduit to prevent passage of fluid past said plug.

2. The apparatus of claim 1 wherein said pins have a plurality of said substantially flat surfaces on their inner ends so that the inner ends in radial cross section are polygonal in shape.

3. The apparatus of claim 2 wherein the pins are threadedly connected to the conduit to thereby provide said means for providing said reciprocation of the pins.

4. Apparatus for forming a fluid tight closure between pressure vessels, comprising a conduit adapted to connect the vessels and having a plurality of openings therein, tubular parts welded to the exterior of the conduit to form continuations of the openings therein, a plug having an annular surface thereabout and insertable into the conduit from one of the vessels, a pin slidably received within each opening and the tubular part forming a continuation thereof between a retracted position to permit insertion and removal of the plug and an extended position in locking position over the annular surface of the plug, means to prevent removal of the pins from extended position, a surface on the inner end of said pins coplanar with said annular surface, indexing means on the outer end of each pin for orienting said surface on the inner end thereof into face-to-face engagement with said annular surface, and means for sealing between the plug and conduit intermediate the other vessel and the openings in the conduit.

5. Apparatus for forming a fluid tight closure between pressure vessels, comprising a conduit for connection to the vessels at its opposite ends, a plug insertable into one end of the conduit and having an annular surface facing said end when so inserted, a plurality of pins mounted on the conduit for rotation and reciprocation between a position in which their inner ends are retracted to permit insertion and removal of the plug and another position in which they are extended into locking relation over said annular surface, surfaces on the inner and outer ends of each pin which are parallel to one another and coplanar to the annular surface of the plug for orienting the inner of said surfaces into face-to-face engagement with the annular surface on the plug, and means sealing between the plug and conduit when said surfaces are so engaged to prevent the escape of fluid from one of said vessels.

6. Apparatus for forming a fluid tight closure between pressure vessels, comprising a conduit for connection to the vessels at its opposite ends, a plug insertable into the conduit through one end thereof and having an annular endwise surface thereabout facing said end when so inserted, a plurality of pins mounted on the conduit for reciprocation between positions in which their inner ends are retracted to permit passage of said plug transversely of said pins and movement wherein said pins are extended into locking position over said annular surface, said pins having a substantially flat surface of substantial area on the annular surface at the inner ends thereof, means for providing said reciprocation including means indicating the orientation of said pins, the last-mentioned means being observable from the exterior of the conduit, said substantially flat surface being disposable for face-to-face engagement with said annular surface of the plug, and means for sealing between the plug and conduit to prevent passage of fluid past said plug.

7. Apparatus for forming a fluid tight closure between pressure vessels, comprising a conduit adapted to be connected to the vessels at its opposite ends, a plug insertable into the conduit and having a substantially radially extending annular surface, a plurality of pins mounted on the conduit for rotation and reciprocation between a retracted position to permit insertion and removal of the plug and an extended position in which their inner ends are disposed in locking position over the annular surface, the inner end of each pin having a plurality of surfaces thereabout coplanar with the annular surface on the plug, indexing means comprising a plurality of surfaces on the outer end of each pin parallel to the surfaces on the inner end thereof to permit orientation of any one of said inner surfaces into face-to-face engagement with said annular surface on the plug, and means sealing between the plug and conduit when said surfaces are so engaged to prevent the escape of fluid from one of said vessels.

8. Apparatus for forming a fluid tight closure between pressure vessels, comprising a conduit for connection to the vessels at its opposite ends, a plug insertable into the conduit from one end thereof and having a groove thereabout, a pin threadedly connected to each opening for movement therein between a retracted position to permit insertion and removal of the plug and an extended position into locking position within the groove about the plug, a surface on the inner end of each of the pins coplanar with an annular surface of the groove facing the other end of the conduit, indexing means comprising a surface on the outer end of each pin parallel to the surface on the inner end thereof for orienting said inner surface on each pin into face-to-face engagement with the annular surface of the groove.

9. Apparatus of the character defined in claim 8, wherein there are a plurality of parallel surfaces on the inner and outer end of each pin.

References Cited in the file of this patent
UNITED STATES PATENTS
2,771,096    Ver Nooy _____ Nov. 20, 1956